Dec. 6, 1938.  O. L. R. JONES  2,139,163

DUPLEX RETRACTILE ELEVATOR FOR AIRPLANES

Filed Jan. 7, 1938

INVENTOR
ORSEMUS L. RAY JONES
BY
ATTORNEYS

Patented Dec. 6, 1938

2,139,163

UNITED STATES PATENT OFFICE 2,139,163

DUPLEX RETRACTILE ELEVATOR FOR AIRPLANES

Orsemus L. Ray Jones, Chicago, Ill.

Application January 7, 1938, Serial No. 183,841

4 Claims. (Cl. 244—87)

This invention relates to controlling means for aircraft. While particularly shown and described in connection with an airplane of more or less conventional construction, it will be seen to be readily applicable to all types of flying machines, of both lighter and heavier than air varieties.

With the constant increase of flying speeds, the minimum or landing speeds have also risen, introducing hazards in the landing of airplanes due to the velocity at which it is necessary to approach the ground, and the consequent increased danger of wrecks in even an obstruction or unduly rough or soft surface is struck by the plane. Brakes upon the wheels are of but slight assistance in this connection, since although they do enable landing in a smaller area, they cannot reduce the speed of the ship until after it strikes the ground.

A known arrangement for reducing the air speed of airplanes consists of flaps extensible laterally from the wings in such manner as to increase the air resistance and so slow the ship, the flaps being of course retractible during normal flying. Such flaps have several objectionable characteristics. They not only reduce stability by their own rudder action, but destroy the slip stream and so prevent it from striking the empennage in the intended manner, rendering the ship less responsive to the controls. They are subjected to great strain and must accordingly be of heavy construction in themselves, and further transmit stresses to the wings, and so undesirably increase the wing stresses and loading. The present invention aims to overcome the aforementioned and other difficulties incident to the use of conventional wing flaps, and to provide novel and improved means for increasing the resistance and so slowing the speed of aircraft while in the air, without in any way affecting or interfering with the stability or controllability of the ship, or the wing loading thereof, and so arranged as to effect actual increase of stability during operation of the speed retarding mechanism.

Other objects include the provision of such means operable by very simple controlling apparatus, manipulation of which does not burden or interfere with the other activities of the pilot.

Still another object is the provision of such a construction which is of extremely light, simple and reliable character.

Other objects and advantages will be apparent from the following description, wherein reference is made to the accompanying drawing illustrating a preferred embodiment of my invention and wherein similar reference numerals designate similar parts throughout the several views.

The present application is a continuation in part of applicant's co-pending application Serial No. 84,066, filed June 8, 1936.

Figure 1:
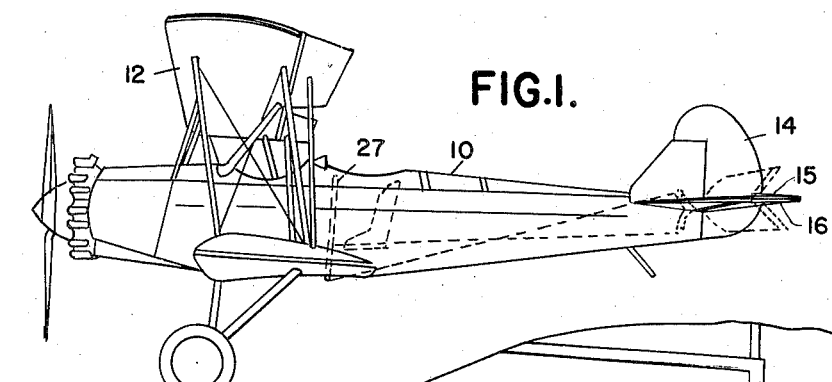
Figure 1 is a side elevational view of an airplane equipped with an elevator mechanism incorporating the principles of this invention.
Figure 2:
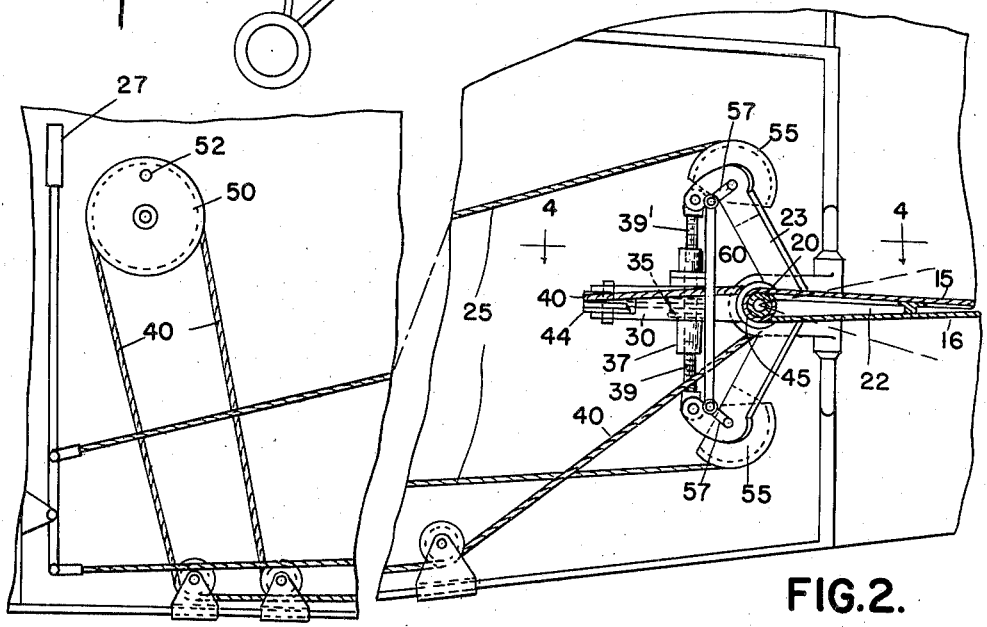
Figure 2 is a diagrammatic side view of the operating mechanism, showing the improved duplex elevator in vertical section, partly broken away.
Figure 4:
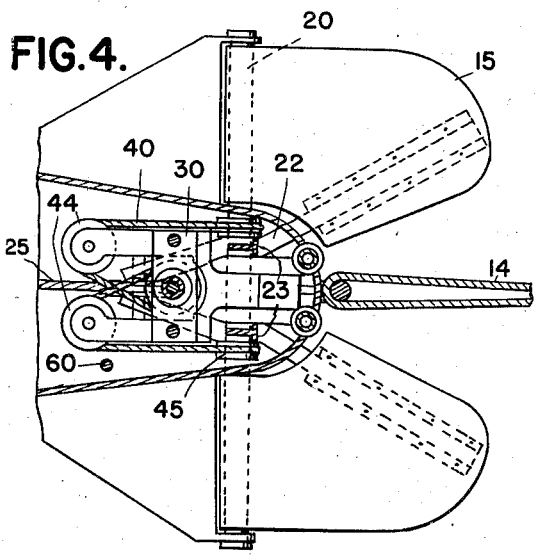
Figure 4 is a horizontal section taken substantially on the line 4—4 of Figure 2 and looking in the direction of the arrows, the elevators and a part of the spreading mechanism being shown in plan.
Figure 3:
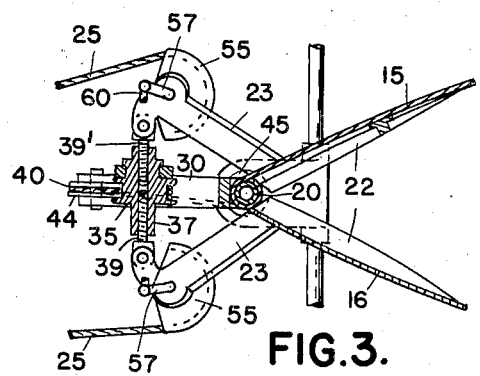
Figure 3 is a similar fragmentary view of the elevator and spreading mechanism only, showing the elevator sections in open or spread relation.

Referring now to the drawing, reference character 10 designates the fusilage of a biplane of the tractor type, shown as of more or less conventional construction, having wings 12 and an empennage assembly located in the slip stream, including a rudder 14 and an elevator formed in two sections, one located upon each side of the rudder and both pivoted upon a transverse rod 20 supported in the empennage in the usual or any suitable position. Each elevator section is divided into upper and lower leaves 15—16, hinged and adapted to open and close with respect to each other as well as swingable as a unit upon the rod in the usual manner. When closed the upper and lower leaves lie closely adjacent one another to form an elevator which may be of the ordinary proportions, as shown in full lines in Figures 1 and 2. The upper and lower leaves are carried by separate frame members as 22 pivoted on rod 20. Each elevator frame portion 22 incorporates an angularly forwardly extending arm 23. Arms 23 extend obliquely away from each other, and to their extremities the operating cables 25 for the elevator assembly may be connected. By such cables the entire elevator assembly may be swung as a unit in the conventional manner. For this purpose a joy stick 27 may be arranged in the pilot's cockpit, to which stick the cables are shown connected.

Also pivoted upon the elevator rod 20 is a forwardly extending frame member 30 swingable both with and independently of the elevator sections, and carrying the operating pulley 35, which is journaled in the frame and serves to actuate an interiorly threaded sleeve 37. The sleeve is shown formed as a unit with the pulley and provided with right and left hand threads as at its opposite ends. A cooperatively threaded stem 39, 39' is articulated to each of arms 23. Having opposite threads, the stems are movable simultaneously inwardly and outwardly of the sleeve, which acts like a turnbuckle to so move them when it is revolved by means of the pulley member 35 is of course held against vertical displacement with respect to the frame 30, and is rotatable by a cord or cable 40 wrapped thereabout and run over suitable arranged guiding means in such manner that it may be freely operated to revolve the operating pulley regardless of the angle of the upper and lower leaves of the elevator with relation either to each other or the line of flight, and as well during movement of the elevators as when at rest. The frame 30 and pulley 35 remain centered with respect to arms 23 regardless of movement of the latter, by virtue of the floating arrangement of turnbuckle sleeve 37, while this double threaded arrangement also enables quicker operation and/or greater mechanical advantage.

In the illustrated construction guide pulleys 44 are shown arranged at extremities of the frame 30, and additional guide pulleys 45 are journaled upon the elevator rod 20, one on either side of frame 30. After passing over pulleys 44—45 it will be seen that the cable 40 may be run to the pilot's compartment or elsewhere to any suitable operating mechanism, and it is to be understood that when the cable travels in one direction the rotation of the sleeve 37 thereby induced moves the arms 23 closer together, to thereby spread the elevator sections 15—16, while running the cable in the opposite direction and so rotating the sleeve 37 oppositely tends to separate the arms 23 and so close sections 15—16 upon one another, toward the position in which they lie adjacent and complement one another to form a unitary elevator assembly which may be substantially of conventional form and proportions when so closed, as shown. The operating mechanism for the spreading cable 40 may comprise a pulley 50, journaled at one side of the pilot's cockpit and provided with a crank handle 52.

The rudder operating cables 25 are preferably not directly connected to the arms 23, but incorporate take-up means whereby tension thereof may be maintained regardless of the relative positioning of the two arms. For this purpose I have shown the arms 23 as carrying at their ends segmental take-up pulleys 55, to which the ends of cables 24 are attached and about which they are partially wrapped. The pulleys 55 are arranged to be turned, to take up on the cable, as the arms 23 approach one another, and to rotate in opposite directions to pay out the cable as the arms are separated. For this purpose a crank arm as 57 is secured to each pulley 55, and a rigid link 60 extends between the ends of the crank arms, acting in compression when elevator arms 23 move together, to turn the cranks and so the pulleys to take up on the cable, and acting in tension as arms 23 separate, to pull upon the cranks and so turn the pulleys in opposite directions, thereby paying out the cable. The effect of such actuation of the pulleys 55 will be seen to maintain substantially constant the tension upon elevator cables 25, which may thus be operated entirely independently of the cable 40 by which the spreading mechanism is actuated, and it will be understood that control of the ship is thus easily maintained regardless of whether the elevator sections be spread or closed, the effect of the elevator assembly upon the ship being the same in any case, its action when the sections are spread being merely to increase the air resistance, and to increase likewise the stability of the ship, by imposing the entire drag at the rear thereof and substantially horizontally, thus greatly reducing the possibility of a nose-over during landing. It will also be understood that the elevator sections may be spread preparatory to landing, the air speed thus greatly reduced, and need not be manipulated or changed at all during the act of landing, which may be effected in the usual way without requiring the pilot to pay any attention to the spreading mechanism.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. Means for retarding the air speed of aircraft, comprising in combination with a flying machine, flight directing means pivoted thereto upon a substantially fixed axis, including a pair of leaves individually movable about said axis, operating means connected to said leaves for simultaneously swinging both thereof as a unit and in the same direction about said axis, separate operating means for swinging said leaves toward and from each other about said axis, comprising right and left threaded portions articulated to said leaves but held against rotation about a longitudinal axis, and a cooperatively threaded actuating element having right and left threaded portions engaging with said first mentioned threaded portions, said element being rotatable to move such first-mentioned threaded portions, and so the leaves, toward and from each other.

2. In combination with a flying machine, a flight directing element comprising a pair of leaves pivotally attached to the machine and individually swingable about a common axis, combined adjusting and connecting means connected to both of said leaves and movable therewith when both thereof are swung as a unit, means for so swinging both leaves as a unit, and means for actuating said combined adjusting and connecting means to move the leaves toward and from each other, said actuating means including a pair of oppositely threaded elements pivotally but non-rotatably connected to the leaves, and a cooperatively threaded rotatable driving member operatively engaging said actuating means to move said first mentioned threaded elements, and the leaves connected thereto, toward and from each other.

3. Air speed retarding means for aircraft, comprising in combination with supporting means, a flight directing assembly pivoted thereto comprising separable sections swingable toward and from each other about the axis of pivotal support of the assembly, cable operating means including cable portions connected to each of said sections for swinging said sections as a unit about said axis, independent operating means for moving said sections toward and from each other, and take-up means operable by movement of one of said sections toward and from the other for preventing undue variation of the tension of said cable operating means when said sections are moved with respect to each other.

4. Means for retarding the flight of aircraft, comprising in combination with a flying machine, flight directing means pivoted thereto upon a substantially fixed axis including a pair of leaves individually movable about said axis, spreading means for moving said leaves toward and from each other about said axis, cable operating means including cable portions connected to each leaf for swinging both of said leaves as a unit and regardless of their relative angular positioning to control the direction of flight, and take-up means for said cable operating means to prevent variation of tension thereof during movement of said leaves toward and from each other, including a movable cable connector attached to the cable portion adjacent one leaf, and means connecting said cable connector to the other leaf for actuation by relative movement of the leaves to change the tension upon the cable.

ORSEMUS L. RAY JONES.